Figure 1:
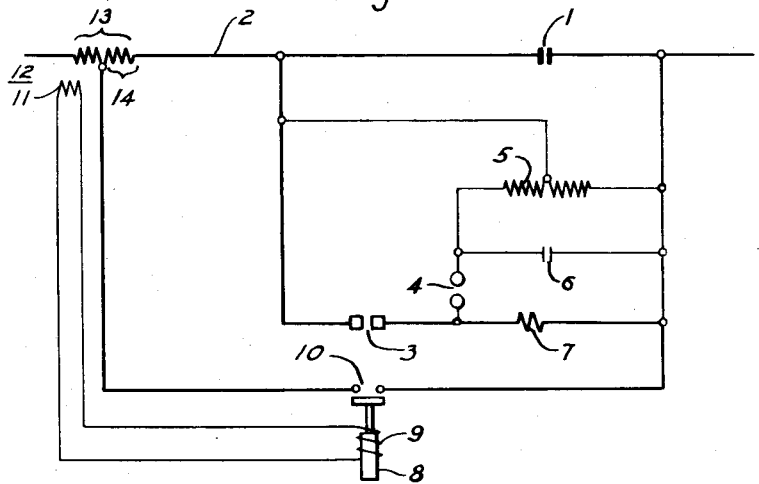

June 13, 1939.  R. E. MARBURY  2,162,488

SERIES CAPACITOR PROTECTIVE SYSTEM

Filed March 5, 1938

WITNESSES:

INVENTOR
Ralph E. Marbury.
BY
ATTORNEY

Patented June 13, 1939

2,162,488

UNITED STATES PATENT OFFICE 2,162,488

SERIES CAPACITOR PROTECTIVE SYSTEM

Ralph E. Marbury, Wilkinsburg, Pa., assignor to Westinghouse Electric & Manufacturing Company, East Pittsburgh, Pa., a corporation of Pennsylvania Application March 5, 1938, Serial No. 194,157

3 Claims. (Cl. 175—294)

My invention relates to a simplified protection-means for series capacitors, for protecting the same against over-voltages due to excessive currents.

Series capacitors are utilized, in series with alternating-current circuits, for neutralizing some or all of the inductance of the circuit, and are rated for a certain specified "normal" full-load current, with the understanding that the capacitor will continue to operate for a brief overcurrent of the value of 150% normal, and will also withstand an extremely brief overcurrent of a value of 200% normal. Since the capacitor-voltage is proportional directly to the current, it is obvious that this voltage must be limited in the same manner as the current. Protective shunting gaps have been devised which will quickly flash over when the 200% voltage-value is reached, thereupon establishing a low-voltage arc circuit around the capacitor and, in effect, short-circuiting the capacitor so that the capacitor is put out of service. It is generally desirable to subsequently bypass the gap-circuit, in order to prevent damage to the gap-device, and to this end a shunting circuit is provided, which contains the contacts of an electromagnetic contactor, the satisfactory control of which presents some problems.

Heretofore, the contactor-coil has been energized in response to current flowing in the bypass circuit which contains the contactor-contacts. This method of operation has had certain more or less serious disadvantages. For one thing, there has been an objectionable voltage-drop in the current-responsive apparatus which is connected in this bypass circuit for the purpose of responding to the current therein. It was necessary to devise this current-responsive apparatus so that its voltage-drop during the maximum possible short-circuit current-conditions in the circuit containing the series capacitor should not exceed the permissible voltage-drop on the series capacitor, and this has rendered the operation more or less unreliable when the fault-current was only slightly more than 200% normal current, because of insufficient energy to properly operate the current-responsive device under these conditions. The necessity for designing this current-responsive coil, in the bypass circuit containing the contactor-contacts, so as to withstand a certain maximum current, and to have a certain maximum voltage-drop with this current, has made it necessary to design a special current-responsive coil for each series-capacitor installation. It will be understood that the current which initially flows in the bypassing circuit containing the contactor-contacts is made up of the vectorial sum of the line-current, or current in the circuit containing the series capacitor, and the discharge-current of the series capacitor, the latter current being variable over wide limits, depending upon the portion of the cycle at which the capacitor is short-circuited by the breakdown of the shunting gap-device, and depending also upon the time-constant of the bypassing circuit containing the contactor-contacts, all of which complicated the design and the application of the current-responsive coil, requiring a special coil for almost every installation.

In accordance with my invention, I energize the operating coil of the contactor by means of a current-transformer which is connected in series with the circuit containing the series capacitor, as distinguished from being energized from the bypassing gap-circuit. The current-transformer can be of standard design, which is easily designed to withstand any turn-to-turn stresses which are set up by reason of any transients appearing on the line, so that the contactor-coil may be of ordinary standard design and of simple application, the only thing required to be known being the line-current at which it is desired that the contactor shall trip, this current being normally set for 150% of the "normal" current. Suitable means are readily adopted for causing the contactor-coil to become less effectively energized by the line-current as soon as the contactor is energized, thereby enabling the contactor to drop out at the 150% value of current, or at any other current-value which may be desired. In the application of my invention, it is not necessary, therefore, to utilize anything but standard equipment, and it is not necessary to know the voltage or the size of the series capacitor or the time-constant of its discharge-circuit, the only requisite being a specification of the line-current at which it is desired to have the contactor begin to close its contacts.

Figure 2:
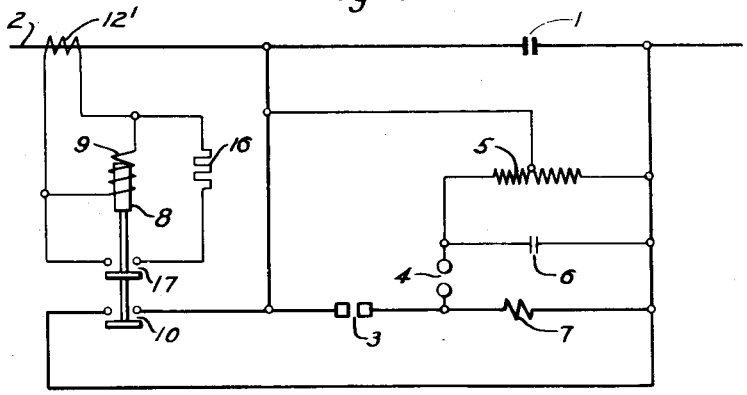

With the foregoing and other objects in view, my invention consists in the apparatus, combinations, circuits and systems hereinafter described and claimed and illustrated in the accompanying drawing, in which:

Figures 1 and 2 are diagrammatic views of circuits and apparatus illustrating my invention in two different forms of embodiment.

My invention is utilized for the protection of a series capacitor 1 which is connected in series with an alternating-current line or circuit 2.

The first line of protection against rapidly rising over-voltages on the series capacitor 1 is a main gap-device 3 which is connected in a bypassing circuit around the capacitor 1.

As set forth in my copending application Serial No. 67,820, filed March 9, 1936, the main gap-device 3 is preferably made of specially constructed massive carbon electrodes having a large heat-storing capacity and a sensitive breakdown-voltage characteristic which, at least at times, is higher than the voltage which can be permitted to appear on the series capacitor. Since these electrodes are of carbon, the arcing-voltage of the main gap-device 3 is necessarily low, which is very desirable, because, as soon as the main gap-device breaks down or arcs over, it becomes ionized and hence, on each subsequent half-cycle, the gap immediately breaks down again before the impressed voltage has built up to a high value, or, in technical terms, the carbon gap-device, with its low arcing-voltage, prevents the building up of high recovery-voltages which would have a tendency to produce high oscillating currents in the circuit formed by the series capacitor 1 and the gap 3.

As described and claimed in my Patent No. 2,072,717, granted March 2, 1937, the main gap-device 3 is tripped off by means of an auxiliary gap-device 4 which is made with metal electrodes which, while having a much higher arcing-voltage drop, can nevertheless be made to have a rather sensitive calibration as to breakdown voltage. In order for this breakdown calibration to be sensitive, it is usually desirable to set the auxiliary gap 4 for a higher voltage than the voltage appearing across the series capacitor 1, and hence the voltage of the series capacitor 1 is usually multiplied by means of a small step-up transformer 5 which energizes the auxiliary gap-device 4 and causes it to break down at the 200% value of the line-current. The auxiliary gap-device 4 is included in a small oscillatory circuit consisting of a small capacitor 6 and a small inductance 7, the latter usually consisting merely of a few turns of wire in air. The air-core inductance 7 is included in the bypassing circuit containing the main gap-device 3, so that, when oscillatory currents are set up in the auxiliary gap-device 4, the oscillatory voltages are applied to the main gap-device 3, causing the latter to break down and form a low-voltage arc around the series capacitor 1.

A bypassing contactor 8 is also provided, having an operating coil 9 and contactor-contacts 10, the latter being provided in a bypassing circuit around the series capacitor 1 and the main gap-device 3.

In accordance with the form of embodiment of invention shown in Fig. 1, the contactor-coil 9 is energized from the secondary circuit 11 of a current-transformer 12 having two primary-winding portions 13 and 14. The primary-winding portion 13 is connected in series with the alternating-current line or circuit 2 which contains the series capacitor 1, so as to be traversed by the line-current under all conditions. The primary-winding portion 14 is connected in series with the bypassing circuit containing the contactor-contacts 10, and is so arranged that, when the contactor-contacts 10 are closed, the energization of the primary winding portion 14 bucks that of the primary-winding portion 13, thereby decreasing the current in the secondary circuit 11. By this means, it is possible to cause the drop-out point of the contactor 8 to coincide with any desired value of the line-current in the line 2.

In the embodiment of my invention shown in Fig. 2, the current-transformer 12' has only one primary-winding portion, and only one current-ratio, and the setting of the drop-out operation of the contactor 8 is controlled by means of an impedance 16 which is shunted around the contactor-coil 9 whenever the contactor is energized, utilizing, for this purpose, either the main contactor-contacts 10 or, as shown, a set of auxiliary contactor-contacts 17. By the means hereinabove described, or by any equivalent means, it is readily possible to adjust the drop-out action of the contactor 8 to occur at any desired value of the current in the line 2.

From the foregoing description, it will be obvious that I have provided a bypassing circuit, containing the main gap-device 3, which is not imperiled by the inclusion of current-responsive contactor-operating devices therein, and that I have provided contactor-control apparatus which is standard in construction and susceptible of successful application without attention to anything other than the value of current at which it is desired to have the contactor begin to operate, and the value of the current at which it is desired to have the contactor begin to drop out again. Upon the occurrence of a short-circuit condition on the load-side of the line 2, resulting in heavy fault-currents flowing through the capacitor 1, the main gap-device 3 will first flash over, in a small fraction of a cycle of the main-line frequency, thus protecting the series capacitor 1, while the contactor 8 closes, in a much more leisurely fashion, commonly requiring as much as 8 cycles to close. As soon as the contactor contacts 10 close, the main gap-device 3 is short-circuited, causing the arc therein to become extinguished. Thereafter, when the fault is cleared from the line 2, the line-current subsides and the contactor 8 drops out, reopening its contacts 10, and restoring the apparatus to its normal operating condition.

While I have described my invention in two different forms of embodiment, it will be obvious that various changes and substitutions may be made without departing from the essential spirit of my invention, at least in its broader aspects, and I desire, therefore, that the appended claims shall be accorded the broadest construction consistent with their language and the prior art.

I claim as my invention:

1. A series-capacitor equipment for an alternating-current circuit, comprising the combination, with the series capacitor, of a main gap-device shunting said series capacitor, a bypass contactor having contacts in shunt to said main gap-device, a series transformer having two primary-winding portions and a secondary circuit, a coil for operating said contactor from energy derived from said secondary circuit, and connections whereby one of said primary-winding portions may be energized in series with said alternating-current circuit, and whereby the other of said primary-winding portions may be opposingly energized in series with said contactor-contacts.

2. A series-capacitor equipment for an alternating-current circuit, comprising the combination, with the series capacitor, of a main gap-device shunting said series capacitor, a bypass contactor having contacts in shunt to said main gap-device, said contactor also having an operating coil, a series transformer in series-circuit relation to said alternating-current circuit, and means for so energizing said operating coil from said series transformer, in dependence upon the position of said contactor, that the ratio between the current in said alternating-current circuit and the effective ampere-turns in said operating coil changes from one approximately definite value to another approximately definite value and back again, as said contactor moves from one position to another and back again.

3. A series-capacitor equipment for an alternating-current circuit, comprising the combination, with the series capacitor, of a series transformer having two primary-winding portions and a secondary circuit, the two primary-winding portions being serially connected between one terminal of the series capacitor and the alternating-current circuit in which the series capacitor is connected, a main gap-device connected so as to shunt said series capacitor but not to shunt either one of said two primary-winding portions, a by-pass contactor having contacts connected so as to shunt said series capacitor and one of said two primary-winding portions, and a coil for operating said contactor from energy derived from said secondary circuit.

RALPH E. MARBURY.